US010785298B2

(12) United States Patent
Anderl

(10) Patent No.: US 10,785,298 B2
(45) Date of Patent: *Sep. 22, 2020

(54) REUSABLE MULTIMODAL APPLICATION

(71) Applicant: Gula Consulting Limited Liability Company, Wilmington, DE (US)

(72) Inventor: Ewald C. Anderl, Middletown, NJ (US)

(73) Assignee: Gula Consulting Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,812

(22) Filed: Dec. 20, 2019

(65) Prior Publication Data

US 2020/0128074 A1 Apr. 23, 2020

Related U.S. Application Data

(60) Continuation of application No. 16/160,350, filed on Oct. 15, 2018, now Pat. No. 10,516,731, which is a
(Continued)

(51) Int. Cl.
*H04M 3/42* (2006.01)
*H04L 29/08* (2006.01)
(Continued)

(52) U.S. Cl.
CPC .......... *H04L 67/1095* (2013.01); *G06F 3/017* (2013.01); *G06F 3/038* (2013.01);
(Continued)

(58) Field of Classification Search
CPC ... H04L 67/1095; G06F 9/451; G06F 16/178; G06F 16/951; G06F 3/038; G06F 3/167;
(Continued)

(56) References Cited

U.S. PATENT DOCUMENTS 5,828,468 A  10/1998 Lee
5,844,979 A  12/1998 Raniere
(Continued)

FOREIGN PATENT DOCUMENTS

EP  1 100 013 A2  5/2001
EP  1 423 968      6/2004
(Continued)

OTHER PUBLICATIONS

Hickey, M. (ed.), "Multimodal Requirements for Voice Markup Languages," W3C Working Draft, Jul. 10, 2000, http://www.w3.org/T/multimodal-reqs [retrieved Jun. 13, 2011], 19 pages.
(Continued)

*Primary Examiner* — Marcos Batista
(74) *Attorney, Agent, or Firm* — Christensen O'Connor Johnson Kindness PLLC

(57) ABSTRACT

A method and system are disclosed herein for accepting multimodal inputs and deriving synchronized and processed information. A reusable multimodal application is provided on the mobile device. A user transmits a multimodal command to the multimodal platform via the mobile network. The one or more modes of communication that are inputted are transmitted to the multimodal platform(s) via the mobile network(s) and thereafter synchronized and processed at the multimodal platform. The synchronized and processed information is transmitted to the multimodal application. If required, the user verifies and appropriately modifies the synchronized and processed information. The verified and modified information are transferred from the multimodal application to the visual application. The final result(s) are derived by inputting the verified and modified results into the visual application.

30 Claims, 3 Drawing Sheets

Related U.S. Application Data continuation of application No. 15/863,039, filed on Jan. 5, 2018, now Pat. No. 10,104,174, which is a continuation of application No. 15/345,209, filed on Nov. 7, 2016, now Pat. No. 9,866,632, which is a continuation of application No. 14/755,105, filed on Jun. 30, 2015, now Pat. No. 9,489,441, which is a continuation of application No. 14/203,093, filed on Mar. 10, 2014, now Pat. No. 9,069,836, which is a continuation of application No. 13/491,424, filed on Jun. 7, 2012, now Pat. No. 8,670,754, which is a division of application No. 11/418,896, filed on May 5, 2006, now Pat. No. 8,213,917.

(51) Int. Cl.
  G06F 9/451 (2018.01)
  G06F 16/27 (2019.01)
  G06F 16/178 (2019.01)
  G06F 16/951 (2019.01)
  G06F 3/038 (2013.01)
  H04M 3/493 (2006.01)
  G06F 3/16 (2006.01)
  G10L 15/26 (2006.01)
  G06F 3/01 (2006.01)

(52) U.S. Cl.
  CPC ............ G06F 3/167 (2013.01); G06F 9/451 (2018.02); G06F 16/178 (2019.01); G06F 16/27 (2019.01); G06F 16/951 (2019.01); G10L 15/26 (2013.01); G10L 15/265 (2013.01); H04M 3/493 (2013.01); H04M 3/4938 (2013.01); G06F 2203/0381 (2013.01); H04M 3/42204 (2013.01); H04M 2201/42 (2013.01); H04M 2207/18 (2013.01)

(58) Field of Classification Search
  CPC .. G06F 16/27; G06F 3/017; G06F 2203/0381; G10L 15/26; G10L 15/265; H04M 3/493; H04M 3/4938; H04M 3/42204; H04M 2201/42; H04M 2207/18
  USPC ........................................ 455/414.1; 370/338
  See application file for complete search history.

(56) References Cited

U.S. PATENT DOCUMENTS

| | | | |
|---|---|---|---|
| 5,944,791 | A | 8/1999 | Scherpbier |
| 6,018,710 | A | 1/2000 | Wynblatt |
| 6,101,510 | A | 8/2000 | Stone |
| 6,125,376 | A | 9/2000 | Klarlund |
| 6,195,357 | B1 | 2/2001 | Polcyn |
| 6,208,839 | B1 | 3/2001 | Davani |
| 6,282,511 | B1 | 8/2001 | Mayer |
| 6,349,132 | B1 | 2/2002 | Wesemann |
| 6,366,578 | B1 | 4/2002 | Johnson |
| 6,418,199 | B1 | 7/2002 | Perrone |
| 6,424,945 | B1 | 7/2002 | Sorsa |
| 6,490,603 | B1 | 12/2002 | Keenan |
| 6,570,966 | B1 | 5/2003 | Freeman |
| 6,594,348 | B1 | 7/2003 | Bjurstrom |
| 6,604,075 | B1 | 8/2003 | Brown |
| 6,606,611 | B1 | 8/2003 | Khan |
| 6,757,718 | B1 | 6/2004 | Halverson |
| 6,766,298 | B1 | 7/2004 | Dodrill |
| 6,807,254 | B1 | 10/2004 | Guedalia |
| 6,842,767 | B1 | 1/2005 | Partovi |
| 6,983,307 | B2 | 1/2006 | Mumick |
| 7,116,765 | B2 | 10/2006 | Summers |
| 7,210,098 | B2 | 4/2007 | Sibal |
| 7,289,606 | B2 | 10/2007 | Sibal |
| 7,657,652 | B1 | 2/2010 | Balaji |
| 2001/0006890 | A1 | 7/2001 | Ryu |
| 2001/0018353 | A1 | 8/2001 | Ishigaki |
| 2002/0095293 | A1 | 7/2002 | Gallagher |
| 2002/0194388 | A1 | 12/2002 | Boloker |
| 2003/0032456 | A1 | 2/2003 | Mumick |
| 2003/0071833 | A1 | 4/2003 | Dantzig |
| 2003/0162561 | A1* | 8/2003 | Johnson ............... G06F 9/451 455/553.1 |
| 2003/0179865 | A1 | 9/2003 | Stillman |
| 2003/0187656 | A1 | 10/2003 | Goose |
| 2003/0208472 | A1 | 11/2003 | Pham |
| 2004/0006474 | A1 | 1/2004 | Gong |
| 2004/0034531 | A1 | 2/2004 | Chou |
| 2005/0010892 | A1 | 1/2005 | McNair |
| 2005/0049862 | A1 | 3/2005 | Choi |
| 2005/0203747 | A1 | 9/2005 | Lecoeuche |
| 2005/0251746 | A1 | 11/2005 | Basson |
| 2005/0273487 | A1 | 12/2005 | Mayblum |
| 2005/0288063 | A1 | 12/2005 | Seo |
| 2006/0165104 | A1 | 7/2006 | Kaye |
| 2006/0287845 | A1 | 12/2006 | Cross, Jr. |
| 2007/0260972 | A1 | 11/2007 | Anderl |
| 2008/0086564 | A1 | 4/2008 | Putman |

FOREIGN PATENT DOCUMENTS

| | | |
|---|---|---|
| EP | 0 848 373 B1 | 3/2006 |
| EP | 1 873 661 A2 | 1/2008 |
| EP | 2 050 015 | 4/2009 |
| WO | 99/46920 A1 | 9/1999 |
| WO | 99/55049 A1 | 10/1999 |
| WO | 2004/014053 A1 | 2/2004 |
| WO | 2004/077798 A2 | 9/2004 |
| WO | 2007/130256 A2 | 11/2007 |

OTHER PUBLICATIONS

Huang, X., et al., "MIPAD: A Next Generation PDA Prototype," Proceedings of the International Conference on Spoken Language Processing, Beijing, Oct. 16, 2000, vol. 3, pp. III-33-III-36.

Lau, R., et al., "WebGALAXY: Beyond Point and Click—A Conversational Interface to a Browser," Computer Networks and ISDN Systems, Sep. 1997, 29(8-13):1385-1393.

Maes, S.H., and T.V. Raman, "Multi-Model Interaction in the age of Information Appliances," Multimedia and Expo, 2000, ICME 2000, 2000 IEEE International Conference in New York, NY, Jul. 30-Aug. 2, 2000, pp. 1 and 15-18.

Musciano, C., and B. Kennedy, "HTML, The Definitive Guide, Third Edition," © 1998, pp. 211-215.

Niklfeld, G., et al., "Component-Based Multimodal Dialog Interfaces for Mobile Knowledge Creation," Proceedings of the ACL 2001 Workshop on Human Language Technology and Knowledge Management, Toulouse, France, Jul. 6-7, 2001, pp. 1-8.

Pavlovski, C.J., et al., "Reference Architecture for 36 Thin Client Multimodal Applications," Communications and Information Technology, 2004, ISCIT 2004, IEEE International Symposium, Sapporo, Japan, Oct. 26-29, 2004, Piscataway, NJ, USA, IEEE, Oct. 26, 2004, vol. 2, pp. 1192-1197.

International Search Report dated Dec. 16, 2002, in International Patent Application No. PCT/US2002/021058, filed Jul. 3, 2002, 4 pages.

International Search Report dated Nov. 26, 2002, in International Patent Application No. PCT/US2002/024885, filed Aug. 5, 2002, 1 page.

International Search Report dated Feb. 25, 2008, in International Patent Application No. PCT/US2007/009102, filed Apr. 14, 2007, 2 pages.

Written Opinion dated Feb. 25, 2008, in International Patent Application No. PCT/US2007/009102, filed Apr. 14, 2007, 4 pages.

European Search Report dated Jan. 24, 2013, in European Patent Application No. 07755388.1, filed Apr. 14, 2007, 8 pages.

* cited by examiner

REUSABLE MULTIMODAL APPLICATION

CROSS-REFERENCES TO RELATED APPLICATIONS

This application is a continuation of U.S. patent application Ser. No. 16/160,350, filed Oct. 15, 2018, now U.S. Pat. No. 10,516,731, issued Dec. 24, 2019, which is a continuation of U.S. patent application Ser. No. 15/863,039, filed Jan. 5, 2018, now U.S. Pat. No. 10,104,174, issued Oct. 16, 2018, which is a continuation of U.S. patent application Ser. No. 15/345,209, filed Nov. 7, 2016, now U.S. Pat. No. 9,866,632, issued Jan. 9, 2018, which is a continuation of U.S. patent application Ser. No. 14/755,105, filed Jun. 30, 2015, now U.S. Pat. No. 9,489,441, issued Nov. 8, 2016, which is a continuation of U.S. patent application Ser. No. 14/203,093, filed Mar. 10, 2014, now U.S. Pat. No. 9,069,836, issued Jun. 30, 2015, which is a continuation of U.S. patent application Ser. No. 13/491,424, filed Jun. 7, 2012, now U.S. Pat. No. 8,670,754, issued Mar. 11, 2014, which is a division of U.S. patent application Ser. No. 11/418,896, filed May 5, 2006, now U.S. Pat. No. 8,213,917, issued Jul. 3, 2012. U.S. patent application Ser. No. 14/755,105 is related to U.S. patent application Ser. No. 10/211,117, filed Aug. 2, 2002, now U.S. Pat. No. 8,238,881, issued Aug. 7, 2012; to U.S. patent application Ser. No. 10/119,614, filed Apr. 10, 2002, now U.S. Pat. No. 7,289,606, issued Oct. 30, 2007; to U.S. patent application Ser. No. 10/369,361, filed Feb. 18, 2003, now U.S. Pat. No. 7,210,098, issued Apr. 24, 2007; and to U.S. patent application Ser. No. 10/187,486, filed Jul. 1, 2002, now U.S. Pat. No. 6,983,307, issued Jan. 3, 2006.

The entireties of each of the aforementioned patent applications are hereby incorporated herein by reference.

BACKGROUND

The present invention relates generally to the field of networked computing. More particularly, the invention provides a reusable multimodal application on a mobile device. As used herein, multimodality comprises any human mode of interaction on the input side of an application, for example, the user's voice, and/or any visual mode, etc., that allows users to speak, hear, type, touch or see in that application, and one or more human interaction modes on the output side of the application such as the ability to hear and visually see the output. Multimodal interactions thus extend web or other application user interface to allow multiple modes of interaction, offering users, for example, the choice of using their voice, or an input device such as a key pad, keyboard, mouse or stylus. For output, users will, for example, be able to listen to spoken prompts and audio, and to view information on graphical displays.

The market for ring tones, wall papers, and other content is a large and rapidly growing business for mobile operators and content providers. In addition, a significant number of commercial transactions take place over wireless application protocol (WAP) capable mobile devices. The content in the top-level menu visual interface of the WAP capable mobile devices need to be easily accessible to the user in order to effectively perform commercial transactions. Content that cannot be easily found and located by subscribers directly is a lost revenue opportunity for mobile operators and content providers.

Increasingly, applications are moved from a static environment, for example, a desktop computer, to a mobile environment or a set-top box environment, where the mobile devices are smaller and packed with functionalities. The keypad input facility in the mobile device is not user friendly for all types of input operations, and the ability to interact is constrained by the form factor of the device. There is an opportunity to improve the effectiveness in the use of current mobile visual applications on mobile devices, for example, for mobile devices using a browser, WAP, or x hyper text markup language (xHTML).

There is an unmet market need for a method and system that precludes the need of performing custom development for each application in order to provide a multimodal functionality to the mobile device.

There is an unmet market need for a method and system that implements multimodal functionality without requiring a replacement of the entire software or hardware infrastructure of the mobile device.

SUMMARY

Disclosed herein is a method and system for accepting multimodal inputs and deriving synchronized and processed information. A reusable multimodal application is provided on the mobile device. A user transmits multimodal commands to the multimodal platform via the mobile network. The one or more modes of communication that are inputted are transmitted to the multimodal platform(s) via the mobile network(s) and thereafter synchronized and processed at the multimodal platform. The synchronized and processed information is transmitted to the multimodal application. If required, the user verifies and appropriately modifies the synchronized and processed information. The verified and modified information is transferred from the multimodal application to the visual application. The final result(s) are derived by inputting the verified and modified information into the visual application.

The multimodal application seamlessly combines graphics, text and audio output with speech, text, and touch input to deliver dramatically enhanced end user and services experiences. Compared to single-mode voice and visual search applications, the multimodal application of this invention is easier and more intuitive to use. The method and system disclosed herein provides a multimodal application that allows the use of a plurality of modes of communication, whichever is desired or most effective depending on the data needed or the usage environment.

Also disclosed herein is a method using a multimodal application that serves, using a simple set of interface rules, a standard multimodal interface to any visual search interface. The multimodal application of this invention requires input from the user to determine a specific selection among a list of possible results. For example, the multimodal application could be used for searching a music album from among hundreds of possible selections.

The method disclosed herein enhances the selection process of menus on a mobile device by allowing the user to select from a visual list of choices using one or more modes of input.

Also disclosed herein is a method providing a multimodal application that precludes the need of performing custom development for each application in order to provide a multimodal functionality to the mobile device.

Also disclosed herein is a method of implementing multimodal functionality without requiring a replacement of the entire software or hardware infrastructure of the mobile device, for example, without the need to install a new browser on the mobile device.

Also disclosed herein is a method to enable telecommunications carriers to extend their existing visual based portals with text or touchtone input modes, and store-fronts on the mobile device, with a search capability capable of accepting multiple modes of input. For example, it is convenient for the users to speak the service or information topic that they are interested in, and see the service appear immediately on the phone, often bypassing several levels and menus in the process. It is also much easier to speak the name of a category, title, or artist and see that filled in as the text search criteria automatically. By making more content on the mobile device easily accessible, content providers and carriers can realize increased revenues.

The method disclosed herein also reduces the time taken to access a desired menu choice by optimally enabling multiple modes on a mobile device. For example, the method disclosed herein can reduce the time of choosing a desired menu from approximately thirty seconds and five key clicks down to three seconds and only one key click. Even if the menu structure in a portal on the mobile device were to change frequently, the multimodal application would enable the user to continue to effectively conduct transactions on the mobile device without difficulty.

A reusable multimodal application offers a significant revenue opportunity, and more importantly, a market capture and retention opportunity for the mobile operator. Capturing this opportunity is essential in the face of declining average revenue per user (ARPU) and increasing competitive pressure. By delivering a user-friendly multimodal experience, barriers to a user's adoption of new mobile applications and services are significantly reduced. A multimodal application offers opportunities including additional usage, bi-directional pull through of voice and data services, increased revenue from content providers, advertising revenue, premium services, churn reduction and upgrade potentials. The multimodal application gives workers operating in a mobility context, the opportunity to access and leverage the same systems and information that colleagues close to intranet resources enjoy.

DESCRIPTION OF THE DRAWINGS

The foregoing summary, as well as the following detailed description of the embodiments, is better understood when read in conjunction with the appended drawings. For the purpose of illustrating the invention, there is shown in the drawings exemplary constructions of the invention; however, the invention is not limited to the specific methods and instrumentalities disclosed.

DETAILED DESCRIPTION

Figure 1:
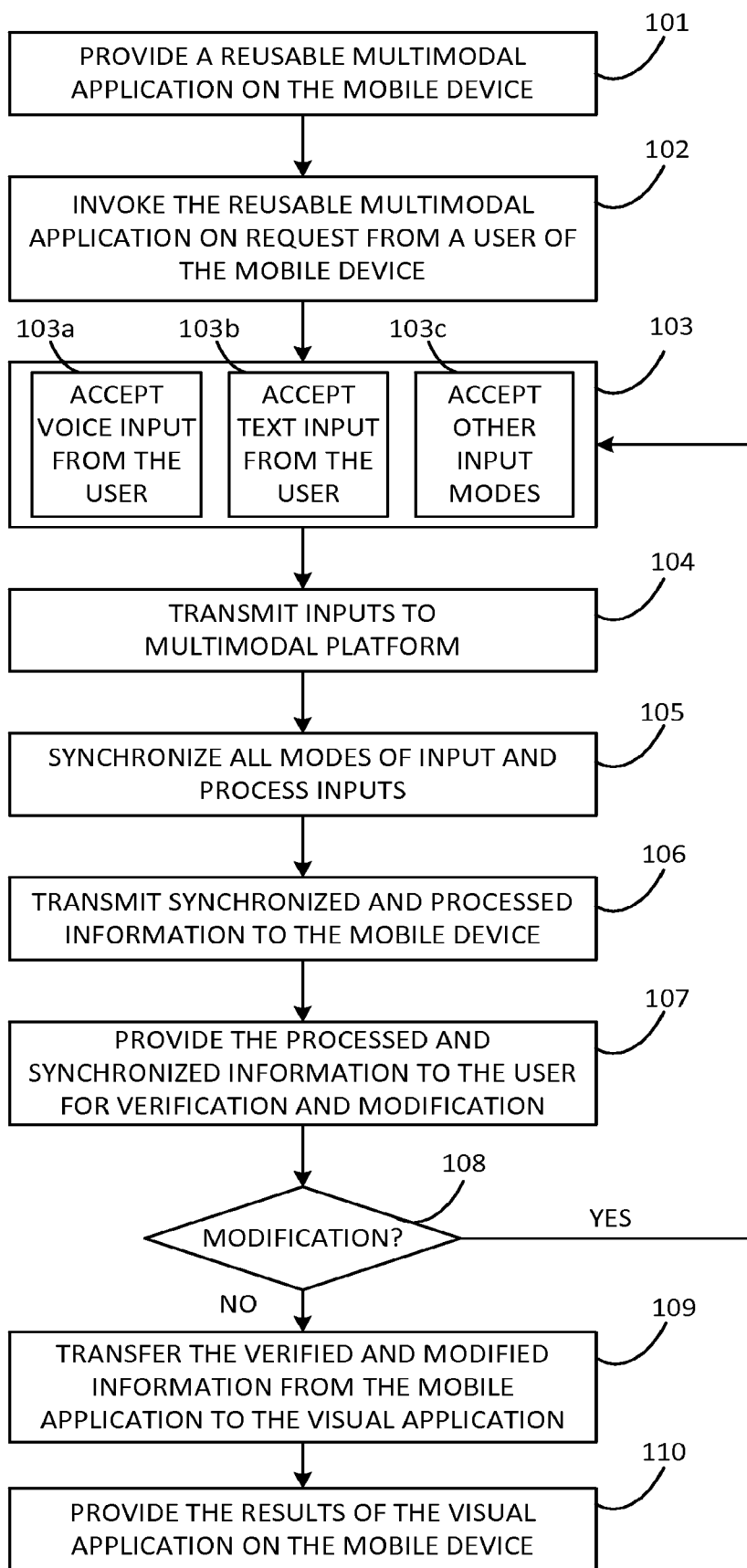
FIG. 1 illustrates a method of accepting multimodal inputs and deriving synchronized and processed information, the method implemented in a system comprising a plurality of mobile devices operated by users who are connected to a plurality of mobile networks that contains a plurality of multimodal platforms.

FIG. 1 illustrates a method of accepting multimodal inputs and deriving synchronized and processed information, the method implemented in a system comprising a plurality of mobile devices operated by users who are connected to a plurality of mobile networks that contains a plurality of multimodal platforms. The plurality of mobile devices contains a plurality of applications. The plurality of applications also comprises visual applications. A multimodal application enables multimodality in the plurality of applications that reside on a plurality of mobile devices 101. The multimodal application is invoked by invoking the visual application on the mobile device based on the request of the user 102. The multimodal application accepts input information from the user in one or more modes of communication 103, such as in voice 103*a*, text 103*b* and other input modes 103*c*. The one or more modes of communication that are inputted are transmitted to the multimodal platform(s) via the mobile network(s) 104 and then synchronized and processed 105 at the multimodal platform. The synchronized and processed information is transmitted to the multimodal application 106. The synchronized and processed information is provided to the user for verification and modification in one or more communication modes 107.

The following example illustrates the synchronizing and processing step. If the input information is a search request in the form of an audio command along with text input, then the audio command and the text input, along with the associated search grammar of the multimodal application is transferred to the multimodal platform through the mobile network. The two modes of input, i.e., the audio command and text input are synchronized. Grammar elements associated with the command and search grammar are recognized by the multimodal platform. Processed information in the form of search words is determined by the multimodal platform based on the recognized grammar elements, and the synchronized and processed information is transferred back to the multimodal application.

If required, the user verifies and appropriately modifies the synchronized and processed information 108. The verified and modified information is transferred from the multimodal application to the visual application 109. The final result(s) is derived by inputting the verified and modified results into the visual application. The final results are provided to the user in one or more modes of communication 110.

The system and method disclosed herein allows users to simultaneously use voice, text, graphics, keypad, stylus and haptic modes to interface with wireless services and applications.

Figure 2:
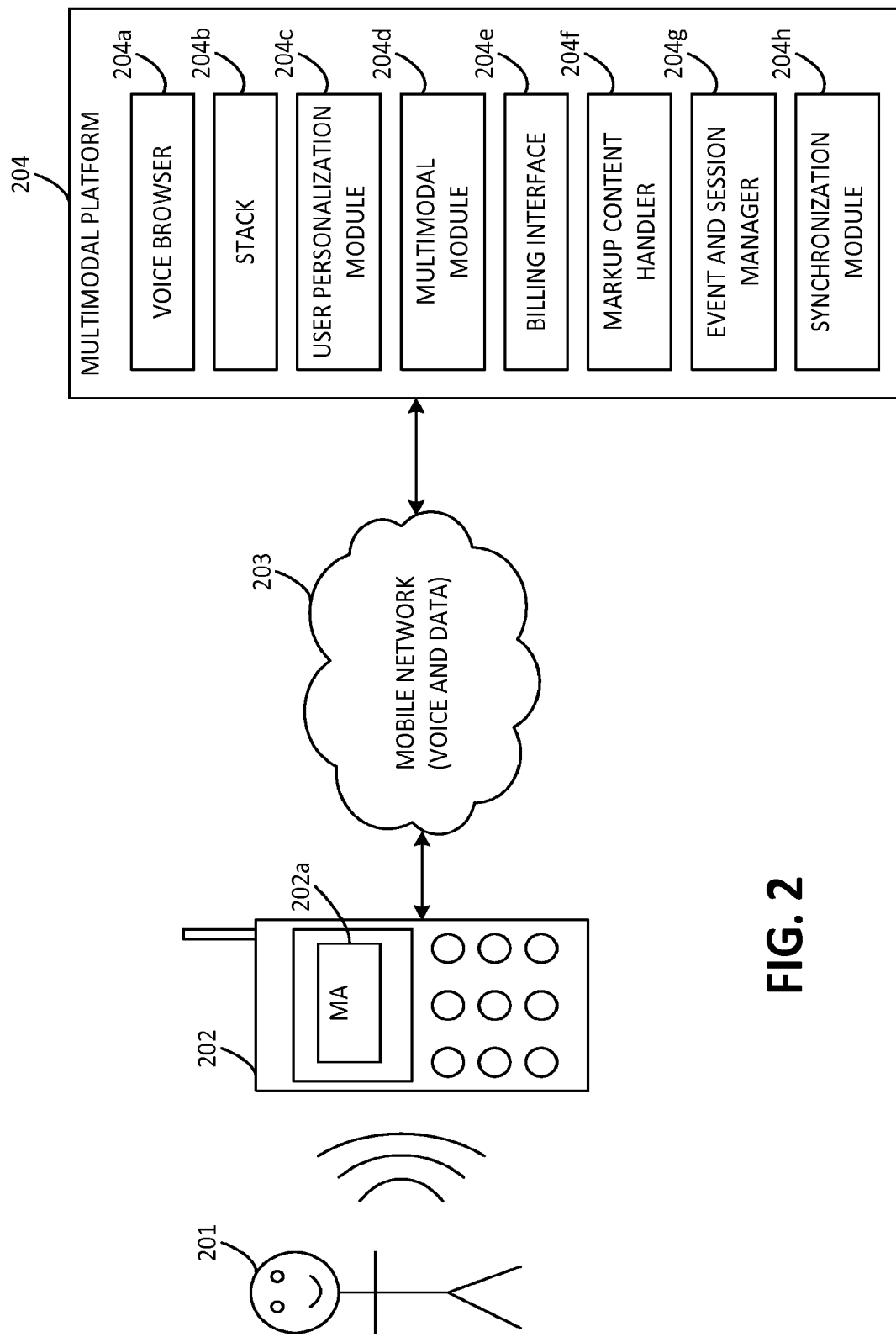
FIG. 2 illustrates a system for accepting multimodal inputs and deriving synchronized and processed information, comprising a plurality of mobile devices operated by users who are connected to a plurality of mobile networks that contains a plurality of multimodal platforms.

FIG. 2 illustrates a system for accepting multimodal inputs and deriving synchronized and processed information, comprising a plurality of mobile devices operated by users who are connected to a plurality of mobile networks that contains a plurality of multimodal platforms. The mobile device 202 comprises a multimodal application 202*a* that is capable of receiving inputs from the user 201 in multiple modes of input. The multimodal application 202*a*, uses a set of interface rules to provide a standard input interface on the mobile device 202. The mobile device 202 communicates with a multimodal platform 204 via a mobile network 203. The system disclosed herein comprises a plurality of mobile devices, multimodal platforms and mobile networks. The multimodal platform 204 further comprises of a voice browser 204*a*, stack 204*b*, user personalization module 204*c*, multimodal module 204*d*, billing interface 204*e*, a markup content handler 204*f*, event and session manager 204*g*, and synchronization module 204*h*. The voice browser 204*a* allows users to conduct searches using audio commands. The stack 204*b* is a reserved area of memory used to keep track of internal operations. The user personalization module 204c stores user specific information. The multimodal module 204d contains a grammar module for recognizing the grammar elements associated with an audio command. The billing interface 204e generates user specific billing information. The markup content handler 204f provides the visual markup or data content associated with the visual interface. Using the proposed invention, telecommunication carriers may monetize multimodal applications immediately, thereby leveraging devices already widely deployed in their networks. The event and session manager 204g manages the events and sessions for networking activities associated with the multimodal platform 204. The synchronization module 204h synchronizes the voice, visual and haptic modes of communication.

The method and system disclosed herein supports a plurality of mobile network 203, inclusive of, but not restricted to code division multiple access (CDMA), CDMA 1x/3x, global system for mobile communications (GSM), general packet radio service, (GPRS), universal mobile telecommunications system (UMTS), integrated digital enhanced network (iDEN), etc. The multimodal platform 204 receives the multimodal commands from the multimodal application 202a. The multimodal platform 204 synchronizes and processes the input information and transfers the synchronized and processed information to the multimodal application 202a located on the mobile device 202. The multimodal platform 204 enables wireless carriers and service providers to offer applications with integrated voice and visual interfaces. In accordance with the embodiments of the method disclosed herein, the multimodal platform 204 may facilitate communication with mobile device 202 in multiple communication modes. For example, the multimodal platform 204 may be adapted to send audio information to and receive audio information from wireless telephone through a switch using a voice channel. The multimodal platform 204 may likewise be adapted to send visual data to and receive visual data from the mobile device 202 through a switch using a data channel. Moreover, the multimodal platform 204 may be adapted to change between these multiple modes of communication, or make multiple modes available simultaneously, according to instructions or existing communications conditions. The multimodal platform 204 may be embodied as a computing device programmed with instructions to perform these functions. In one embodiment of the invention, the voice and data connections run simultaneously over an internet protocol (IP) connection between the multimodal platform 204 and the multimodal application 202a. The multimodal platform 204 is described in greater detail in U.S. Pat. No. 6,983,307, titled "Synchronization Among Plural Browsers", issued Jan. 3, 2006, and U.S. patent application Ser. No. 10/369, 361 titled "Technique for Synchronizing Visual and Voice Browsers to Enable Multi-Modal Browsing," filed Feb. 18, 2003.

The multimodal application 202a that accepts a plurality of modes of input, can be implemented in a number of ways. For example, the multimodal application can be implemented as a Java 2 micro edition (J2ME MIDlet), as a browser plug-in, etc. When a visual application, for example a WAP or xHTML browser requires a search, the visual application invokes the multimodal application 202a with appropriate input parameters. The input parameters comprise the search grammar, the search service to use, the base home URL to visit in order to display, etc. If required, an appropriate audible prompt, such as text, for text to speech (TTS) output, or as an audio file can be provided. The multimodal application's 202a appearance can be customized by specifying user interface (UI) parameters. For example, a custom logo can be introduced in the multimodal application. The multimodal application 202a comprises global grammar elements that can be invoked by the user using predefined multimodal invocation commands.

The multimodal application 202a can accept audio input, which, along with the search grammar, is transferred, via the mobile network, to a multimodal platform. For example, the search grammar can be directly passed as an extensible markup language (XML) document, or a URL to a voice extensible markup language (VXML) page, or an extensible hyper text markup language (xHTML). VXML is a predefined set of rules or a language that enables a user to browse or interact with a device using voice recognition technology. XML is a text document that contains mark-up tags for conveying the structure of data and enables efficient data interchange between devices on the intranet. xHTML is a combination of HTML and XML that is specifically applicable for intranet enabled devices.

The multimodal application 202a provides multiple modes of communication, inclusive of but not restricted to the voice mode, visual and haptic modes. When the voice mode is used, the microphone on the mobile device captures audio commands of the user. When the visual mode is used, data is captured on the mobile device on the keypad. For example, alpha-numeric data which may be represented in American standard code for information interchange (ASCII) form can be visually displayed. The multimodal application 202a interfaces with the native visual and voice resources of the mobile device. The multimodal application 202a can be installed on devices such as, but not restricted to Symbian operating system of Symbian Inc., USA, MS smartphone of Microsoft Inc., J2ME, binary run-time environment for wireless (brew), and Palm operating system of Palm Inc., USA, MS Pocket PC of Microsoft Inc., and MS Pocket PC phone edition of Microsoft Inc. The mobile device comprises a communication component and computing component. The computing component typically has a memory that stores data and instructions; a processor adapted to execute the instructions and manipulate the data stored in the memory; means for input, for example, a keypad, touch screen, microphone, etc.; and, means for output, for example, liquid crystal display (LCD), cathode ray tube (CRT), audio speaker, etc. The communication component is a means for communicating with other mobile devices over a network, for example, an Ethernet port, a modem, a wireless transmitter/receiver for communicating in a wireless communications network, etc.

Depending on the usage context, the multimodal application 202a can take multiple forms and can address a variety of user needs and enable different types of multimodality. Consider the case wherein a user desires to fill in a visual form on the UI using voice commands. The grammar elements in the voice command are recognized by the multimodal platform, and the synchronized and processed information is transferred back to the multimodal application 202a. The multimodal application 202a provides the synchronized and processed information as input to the visual application, for example in the form of an extended URL and the search term(s) filled into the visual form. The synchronized and processed information may be in the form of a single recognized search term, or as a list of possible recognized terms. The user can choose the correct item from the list of possible recognized terms and, once satisfied with the search term, the user can activate the search as is normally done with a visual-only application.

Examples of different variants of the multimodal application 202a are as follows. The "SearchBar" variant of the multimodal application 202a accepts audio input, which, along with the associated search grammar, is transferred via the mobile network to the multimodal platform. The SearchBar enables a user to go directly to a specific page of interest through voice input instead of having to navigate through several links. The SearchBar provides the result as input to the visual application, for example, in the form of an extended URL, and the search term(s) filled into the visual form. The "Inputbar" variant of the multimodal application 202a is applied where more general information is required by the visual application. For example, consider the case when a user needs to purchase an item using their mobile device. The user needs to fill in their residential address in the "shipping address" section of the form displayed on the mobile device. The user then brings up the InputBar, and fills in the form using multiple modes of input, for example, fills in the form using both voice commands and the keypad. The "DictationBar" version of the multimodal application 202a is applied where the input is freeform, such as a text or e-mail message. For example, consider a case where a user sends a short message service (SMS) reply. The user selects DictationBar to input the text. The user can then visually correct the text that is not spelled accurately, i.e., recognized incorrectly. The user can accomplish this correction activity by visually selecting the inaccurate text section and thereafter speaking or modifying the text section by visually typing or selecting from alternate displayed text that has a close recognition confidence. The "PortalBar" version of the SeachBar is used to access web-pages, by directly accessing the web-pages using multiple modes of input, from a general portal, for example Yahoo!, without the requirement for navigating through multiple links. The "IP Bar" version of the multimodal application 202a enables a user to bookmark desired URL's with predefined voice commands, and the user can then access the desired URL's using voice commands. The bookmarking function is further described in co-pending patent application Ser. No. 10/211,117, titled "System and Method for Providing Multi-Modal Bookmarks," filed Aug. 2, 2002.

The multimodal application 202a can be preloaded on the mobile device, or downloaded onto the mobile device on demand, or it may be pre-burned onto the read only memory (ROM) of the mobile device. The multimodal application 202a can also be implemented as a multimodal web page, or as a web browser.

The multimodal system architecture of this invention allows the use of standard capabilities, for example Java, Applets, the integration and interfacing with web, installing new applications on the device, etc. The multimodal system architecture of this invention can leverage all these capabilities without requiring a replacement of the entire software or hardware infrastructure of the mobile device, for example, without requiring the installation of a new browser on the mobile device.

In the current art, a multimodal infratructure with a complete and simultaneous activation of all its modes of communication, including voice, key input and visuals, demands a significant amount of the mobile device's and the multimodal platform's resources. The method and system disclosed herein provides a preferential mode activation feature, wherein, only a preferred mode chosen by the user is activated at any point in time. For example, the visual mode will be activated when the user taps once on the multimodal application 202a and indicates the preference for the visual mode only, following which, the user activates the voice mode by speaking or tapping twice.

The multimodal application 202a supports both sequential multimodality and simultaneous multimodality.

Sequential multimodality allows users to move seamlessly between visual and voice modes. Sequential multimodality offers real value when different steps of a single application are more effective or efficient in one mode than the other. For example, in a navigation application, it may be easier to speak the name of the place (voice mode) than to type it, yet it may be preferable to view a map (visual mode) than to listen to directions that may involve a half dozen turns. The swap between two modes may be initiated by the application, or by the user. Sequential multimodality is described in greater detail in U.S. patent application Ser. No. 10/119,614, titled "Mode-Swapping in Multi-Modal Telephonic Application," filed Apr. 10, 2002. Briefly, the state of the two modes, i.e., the visual and voice mode are synchronized. The multimodal application generates events relating to navigational activity being performed by a user in one mode. A representation of the events that have occurred in a multimodal session are recorded and are subsequently used to set the input in the second mode to a state equivalent to that which the input in the first mode would be in if the user had performed, on the input in the second mode, a navigational activity equivalent to that which the user performed on the input in the first mode.

In the case of simultaneous multimodality, where the device has both modes active, the user can communicate in the visual and voice mode simultaneously. For example, in a mapping example, a user can point to a street on the map and say: "Plan route, avoiding this street." In a retail banking application, with "From Account", "To Account", and "Amount" boxes on the screen, the user may enter the number "5000" in the amount box using the keypad, then simply speak "Transfer from Account 123 to Account 456; Enter" and all three entry boxes will be populated correctly and the information delivered to the multimodal platform 204. The synchronized and processed information from the multimodal platform 204 can be delivered in voice mode, visual, or both and provide positive confirmation of the transaction.

Figure 3:
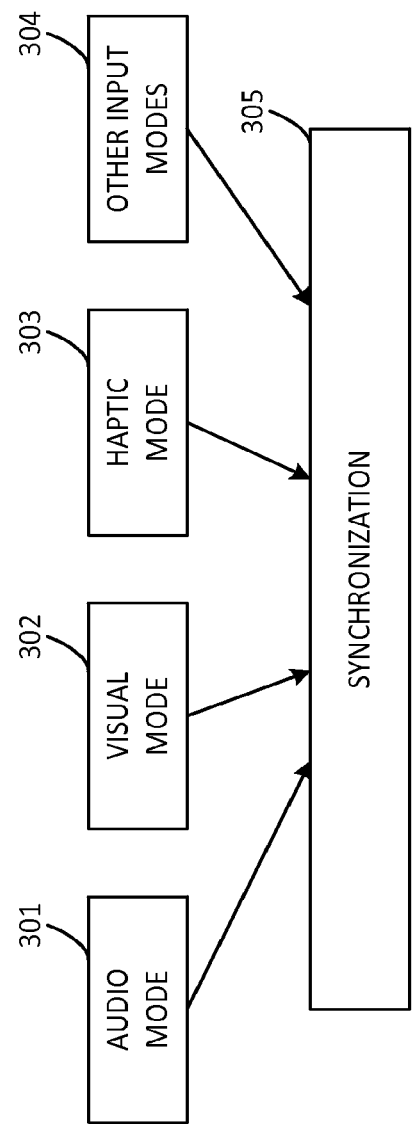
FIG. 3 illustrates the multiple modes of interaction between the user and the multimodal application.

FIG. 3 illustrates the multiple modes of interaction between the user and the multimodal application. The user communicates with the multimodal application 202a, using one or more of the following modes: audio mode 301, visual mode 302, such as through a stylus, and haptic mode 303, such as through a haptic device. The different modes are synchronized 305. A haptic mode is a mode of communication, or interface with a computing device. For example, a mobile phone with haptic capabilities enables a haptic mode of input. The haptic mode of communication is enabled through a tactile method, and uses a haptic device that senses body movement or in general, a user's intention. For example, using a haptic glove, a user can feel and move a ball, and this movement is simultaneously effected on the display of the device, wherein the ball can be made to move correspondingly on the display of the device.

In addition to the audio, visual and haptic modes of input, the multimodal application 202a can also accept other modes of input 304, for example, global positioning system (GPS) inputs. For example, the user can say: "Make a reservation over there" while pointing their mobile device at a restaurant across the road. Assume that the mobile device is GPS enabled and is capable of deriving the position coordinates of objects it is pointed at. In this case, in addition to the audio and haptic input, the GPS input is also transferred to the multimodal platform 204.

The multimodal system architecture of this invention enables push to talk over cellular (PoC) phones, wherein the push to talk command (PTT command) is transmitted to the multimodal platform for initiating or terminating a session. A session is initiated when the multimodal platform 204 becomes aware of the user, i.e., when the user is provided a plurality of modality interfaces and then the user invokes an initiation command through a predefined input. Similarly, the user can end a session with a predefined input, or session ends if the multimodal platform 204 ceases to register activity at the user's end.

The following example illustrates the multimodal application's 202a ability to provide multimodal capabilities. Consider a case wherein a user desires to locate "Edison, N.J. 08817" using the weblink Yahoo Maps on the user's mobile device. The user can double tap on the multimodal application 202a residing in the UI of the mobile device, and then the user can provide the spoken command: "Locate Edison, N.J. 08817". The method and system disclosed herein provides a means for mixing visual input tapping and speech inputs in a manner that is an easy and natural experience to the end user. Once the user has finished inputting the search parameters, the user can submit the map request.

This invention can be effectively applied in a variety of networks and usage environments. For example, it can be internet based with web and WAP interfaces to mobile devices, or it can be linked to a corporate intranet, or other private networks. For example, in a corporate application, the multimodal application 202a can allow an employee of a firm to provide search input parameters specific to the local and network applications and resources of the firm. For example, an employee using the multimodal application 202a can search for "John Smith", and access John Smith's contact information in the corporate address book. The multimodal application 202a could formulate input parameters and have them available for accessing not only network resources and web based applications, but also for accessing resources within the mobile device.

The following example illustrates the use of this invention in field services. While inspecting a defective coke machine at the local gas station, Bill pulls out his handset and initiates the diagnostics application. Bill, then says: "Diagnostics for Coke machine". The device returns a list of available diagnostic tests. Bill scrolls and selects the "Cooling diagnostics" link, the second in the list, and sees a summary of the recommended diagnostics procedures for testing the machine. After performing a few diagnostic procedures, Bill concludes that one part needs to be replaced. Again using his handset, he switches to the purchasing part of the field application by saying: "New quote". The spoken command opens a quotation/order form. Bill says: "Add compressor XRT-65, quantity one", adding the correct part to the parts quotation. Then he issues the verbal commands: "Close quote" and "Fax to 555-233-2390" which faxes the parts quotations directly to the main office for processing.

The foregoing examples have been provided merely for the purpose of explanation and are in no way to be construed as limiting of the present method and system disclosed herein. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method comprising:
   receiving, by a first computing device, a search request from a second computing device via a communications network, the search request resulting from an input, in at least a first mode of communication, received by the second computing device;
   generating, by the first computing device, based on the search request, search information comprising search terms or search results for subsequent verification or selection, wherein a first portion of the search information is for presentation in the first mode of communication and a second portion of the search information is for presentation in a second mode of communication; and
   transmitting, by the first computing device, the search information to the second computing device,
   wherein the first mode of communication or the second mode of communication comprises a voice mode of communication, and wherein the search information facilitates activation, at the second computing device, of both the first mode of communication and the second mode of communication.

2. The method of claim 1, wherein the input received by the second computing device comprises input in a voice mode of communication.

3. The method of claim 1, wherein the first mode of communication comprises a voice mode, and wherein the second mode of communication comprises a visual mode or a haptic mode.

4. The method of claim 1, wherein the second mode of communication comprises a voice mode, and wherein the first mode of communication comprises a visual mode or a haptic mode.

5. The method of claim 1, further comprising:
   receiving, by the first computing device, search grammar associated with the search request from the second computing device; and
   identifying, by the first computing device, grammar elements associated with the search request and the search grammar.

6. The method of claim 5, further comprising:
   determining, by the first computing device, search words based at least in part upon the identified grammar elements; and
   including, by the first computing device, the search words in the search information.

7. The method of claim 1, wherein the search information comprises a plurality of search terms, and wherein the search information facilitates the second computing device rendering the plurality of search terms and permitting user selection among the plurality of search terms.

8. The method of claim 1, wherein the search information facilitates the second computing device switching from the first mode of communication to the second mode of communication in response to receiving a user selection of the second mode of communication.

9. The method of claim 1, wherein the input received by the second computing device comprises voice input in a voice mode of communication, and wherein the voice mode of communication is activated by a user speaking.

10. The method of claim 1, wherein the second computing device is a mobile computing device.

11. A computing device comprising a processor and memory, the memory comprising executable instructions that, in response to being executed by the processor, cause the computing device to:
   receive a search request from a remote computing device via a communications network, the search request resulting from an input, in at least a first mode of communication, received by the remote computing device;
   generate, based on the search request, search information comprising search terms or search results for subsequent verification or selection, wherein a first portion of the search information is for presentation in the first mode of communication and a second portion of the search information is for presentation in a second mode of communication; and
   transmit the search information to the remote computing device,
   wherein the first mode of communication or the second mode of communication comprises a voice mode of communication, and wherein the search information facilitates activation, at the remote computing device, of both the first mode of communication and the second mode of communication.

12. The computing device of claim 11, wherein the input received by the remote computing device comprises input in a voice mode of communication.

13. The computing device of claim 11, wherein the first mode of communication comprises a voice mode, and wherein the second mode of communication comprises a visual mode or a haptic mode.

14. The computing device of claim 11, wherein the second mode of communication comprises a voice mode, and wherein the first mode of communication comprises a visual mode or a haptic mode.

15. The computing device of claim 11, wherein the memory further comprises executable instructions that, in response to being executed by the processor, cause the computing device to:
   receive search grammar associated with the search request from the remote computing device; and
   identify grammar elements associated with the search request and the search grammar.

16. The computing device of claim 15, wherein the memory further comprises executable instructions that, in response to being executed by the processor, cause the computing device to:
   determine search words based at least in part upon the identified grammar elements; and
   include the search words in the search information.

17. The computing device of claim 11, wherein the search information comprises a plurality of search terms, and wherein the search information facilitates the remote computing device rendering the plurality of search terms and permitting user selection among the plurality of search terms.

18. The computing device of claim 11, wherein the search information facilitates the second computing device switching from the first mode of communication to the second mode of communication in response to receiving a user selection of the second mode of communication.

19. The computing device of claim 11, wherein the input received by the remote computing device comprises voice input in a voice mode of communication, and wherein the voice mode of communication is activated by a user speaking.

20. The computing device of claim 11, wherein the remote computing device is a mobile computing device.

21. A non-transitory, computer-readable storage medium having stored thereon computer-executable instructions comprising instructions that, in response to being executed by a computing device, cause the computing device to:
   receive a search request from a remote computing device via a communications network, the search request resulting from an input, in at least a first mode of communication, received by the remote computing device;
   generate, based on the search request, search information comprising search terms or search results for subsequent verification or selection, wherein a first portion of the search information is for presentation in the first mode of communication and a second portion of the search information is for presentation in a second mode of communication; and
   transmit the search information to the remote computing device,
   wherein the first mode of communication or the second mode of communication comprises a voice mode of communication, and wherein the search information facilitates activation, at the remote computing device, of both the first mode of communication and the second mode of communication.

22. The computer-readable storage medium of claim 21, wherein the input received by the remote computing device comprises input in a voice mode of communication.

23. The computer-readable storage medium of claim 21, wherein the first mode of communication comprises a voice mode, and wherein the second mode of communication comprises a visual mode or a haptic mode.

24. The computer-readable storage medium of claim 21, wherein the second mode of communication comprises a voice mode, and wherein the first mode of communication comprises a visual mode or a haptic mode.

25. The computer-readable storage medium of claim 21, wherein the computer-executable instructions further comprise instructions that, in response to being executed by the computing device, cause the computing device to:
   receive search grammar associated with the search request from the remote computing device; and
   identify grammar elements associated with the search request and the search grammar.

26. The computer-readable storage medium of claim 21, wherein the computer-executable instructions further comprise instructions that, in response to being executed by the computing device, cause the computing device to:
   determine search words based at least in part upon the identified grammar elements; and
   include the search words in the search information.

27. The computer-readable storage medium of claim 21, wherein the search information comprises a plurality of search terms, and wherein the search information facilitates the remote computing device rendering the plurality of search terms and permitting user selection of one of the plurality of search terms.

28. The computer-readable storage medium of claim 21, wherein the search information facilitates the remote computing device switching from the first mode of communication to the second mode of communication in response to receiving a user selection of the second mode of communication.

29. The computer-readable storage medium of claim 21, wherein the input received by the remote computing device comprises voice input in a voice mode of communication, and wherein the voice mode of communication is activated by a user speaking.

30. The computer-readable storage medium of claim 21, wherein the remote computing device is a mobile computing device.

* * * * *